(12) United States Patent
Suefuji et al.

(10) Patent No.: US 8,568,072 B2
(45) Date of Patent: Oct. 29, 2013

(54) SCREW HOLE SEAL STRUCTURE, AND PRODUCTION METHOD FOR FIBER-REINFORCED RESIN MEMBER

(75) Inventors: Shinichi Suefuji, Toyota (JP); Keiichi Ishii, Hiratsuka (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 364 days.

(21) Appl. No.: 12/993,581

(22) PCT Filed: Jun. 19, 2009

(86) PCT No.: PCT/IB2009/006294
§ 371 (c)(1),
(2), (4) Date: Nov. 19, 2010

(87) PCT Pub. No.: WO2009/156854
PCT Pub. Date: Dec. 30, 2009

(65) Prior Publication Data
US 2011/0076111 A1    Mar. 31, 2011

(30) Foreign Application Priority Data
Jun. 23, 2008 (JP) .................... 2008-163200

(51) Int. Cl.
*F16B 13/04* (2006.01)
(52) U.S. Cl.
USPC ............... 411/34; 411/303; 411/371.1
(58) Field of Classification Search
USPC ........... 411/369, 34, 108, 303, 313, 314, 542; 52/787.1
See application file for complete search history.

(56) References Cited

U.S. PATENT DOCUMENTS

| | | | |
|---|---|---|---|
| 2,760,400 A | | 8/1956 | Mills et al. |
| 3,131,742 A | * | 5/1964 | Munse ........................ 411/301 |
| 3,469,490 A | * | 9/1969 | Pearce, Jr. .................. 411/371.1 |
| 3,510,916 A | * | 5/1970 | Phelan ........................ 425/110 |
| 3,635,272 A | * | 1/1972 | Scheffer ...................... 411/303 |
| 3,646,981 A | * | 3/1972 | Barnes ........................... 411/82 |

(Continued)

FOREIGN PATENT DOCUMENTS

| | | |
|---|---|---|
| FR | 2 693 774 A1 | 1/1994 |
| JP | 61-024971 B2 | 6/1986 |

(Continued)

OTHER PUBLICATIONS

Partial Translation of Notification of Reasons for Refusal dated Mar. 10, 2011, corresponding to Japanese Office Action 2008-163200.

(Continued)

*Primary Examiner* — Gary Estremsky
(74) *Attorney, Agent, or Firm* — Sughrue Mion, PLLC

(57) ABSTRACT

A screw hole seal structure seals a screw hole (13) in molding a fiber-reinforced resin member (1) in which an insert member (4) provided with the screw hole (13) is integrally incorporated. In the structure, a screw member (5) is tightened in the screw hole (13). In the structure, an elastic seal member (6) is compressed within the screw hole (13), in an axial direction of the screw member (5), and is therefore deformed radially outwards by compression force that is created by tightening of the screw member (5), and an air-tight state of the screw hole (13) is maintained by deformation of the elastic seal member (6).

1 Claim, 4 Drawing Sheets

(56) References Cited

U.S. PATENT DOCUMENTS

| | | | | |
|---|---|---|---|---|
| 4,577,450 A | * | 3/1986 | Large | 52/787.12 |
| 4,887,951 A | * | 12/1989 | Hashimoto | 411/371.1 |
| 4,973,208 A | * | 11/1990 | Gauron | 411/82.1 |
| 6,862,863 B2 | * | 3/2005 | McCorkle et al. | 52/787.1 |

FOREIGN PATENT DOCUMENTS

| | | |
|---|---|---|
| JP | 03-006909 U | 1/1991 |
| JP | 04-005028 A | 1/1992 |
| JP | 05-285997 A | 11/1993 |
| JP | 06-063987 A | 3/1994 |
| JP | 6-99456 A | 4/1994 |
| JP | 08-281660 A | 10/1996 |
| JP | 10-202665 A | 8/1998 |
| JP | 11-93930 A | 4/1999 |
| JP | 2002-172647 A | 6/2002 |
| JP | 2002-250329 A | 9/2002 |
| JP | 2004-325283 A | 11/2004 |
| JP | 2005-246875 A | 9/2005 |

OTHER PUBLICATIONS

International Search Report for corresponding International Patent Application No. PCT/IB2009/006294 mailed Oct. 14, 2009.
Written Opinion for corresponding International Patent Application No. PCT/IB2009/006294 mailed Oct. 14, 2009.
Japanese Office Action for corresponding Japanese Patent Application No. 2008-163200 drafted Jun. 14, 2010.

* cited by examiner

SCREW HOLE SEAL STRUCTURE, AND PRODUCTION METHOD FOR FIBER-REINFORCED RESIN MEMBER

BACKGROUND OF THE INVENTION

1. Field of the Invention

The invention relates to a screw hole seal structure for sealing a screw hole in molding a fiber-reinforced resin member, in which an insert member having a screw hole is integrally incorporated, and also relates to a method of producing a fiber-reinforced resin member by using the screw hole seal structure.

2. Description of the Related Art

As a mount method of mounting a mounting member to a fiber-reinforced resin member, there is known a method in which a metal insert having a screw hole is incorporated integrally in a fiber-reinforced resin member, and the screw hole is used to mount a mounting member in the resin member.

In this method, if a fiber-reinforced resin member is molded with the screw hole of the metal insert exposed, the resin solution may enter the screw hole, so that the hardened resin may bury the thread of the screw hole. Therefore, it is a practice to adopt a method in which a block-shape metal insert is incorporated when a fiber-reinforced resin member is molded, and after the molding, a screw hole is formed in the metal insert.

Japanese Patent Publication No. 61-24971 shows a technology in which a mounting hole for a mounting bolt that is formed in a cavity block of a die molding apparatus is sealed with a seal member to block the entrance of the resin solution. The publication also shows as embodiments a method in which a push-in plug, which is a seal member, is freely removably fitted into a bolt hole to close the bolt hole, and a method in which a counterbore for the bolt head is provided with an internal thread portion, and a screw-in plug, which is a seal member, is screwed into the internal thread portion.

If oil adheres to a fiber-reinforced resin, the strength of the fiber-reinforced resin may decline. For example, when fiber-reinforced resin articles are adhered to each other by an adhesive, the adhesion may be inhibited, that is, the adhesion characteristic may be adversely affected.

Hence, in the above method of forming a screw hole in a metal insert after a fiber-reinforced resin member is molded, a wet process that uses cutting oil cannot be performed, and therefore a dry process that does not use the cutting oil needs to be performed. Compared with the wet process, the dry process requires a longer processing time, and therefore requires higher cost.

As a countermeasure, a method is conceivable in which a screw hole is formed in a metal insert beforehand by a wet process, and the screw hole is filled with silicone as a sealing material, and is hardened, and then the metal insert with the screw hole closed in this manner is incorporated integrally into a fiber-reinforced resin member by setting the insert in the mold of the fiber-reinforced resin member.

However, in the above method, the silicone charged in the screw hole may harden, interlocking with the screw thread, so that it may be difficult to remove the silicone from the screw hole, the removal operation is complicated, and may cause cost increase.

Furthermore, in the foregoing method, if the metal insert is incorporated in molding a fiber-reinforced resin member before the silicone completely hardens, the oil seeping from the silicone due to the hardening of the silicone may adhere to the fiber-reinforced resin, and may cause the problem mentioned above.

Therefore, the fiber-reinforced resin member cannot be molded until the silicone charged into the screw hole completely hardens. This may impede prompt operation, and may give rise to a problem of it being impossible to improve productivity.

In addition, it is also conceivable to adopt a method in which the screw hole is closed by a seal member, such as a push-in plug, a screw-in plug, etc., utilizing the technology described in Japanese Patent Publication No. 61-24971. However, the push-in plug is merely fitted in the screw hole in a state in which the plug is pressed due to its own elasticity within the screw hole. The screw-in plug is merely fitted by the external thread of the screw-in plug fastened into the internal thread of the screw hole.

Therefore, if a vacuum molding method is used, for example, a vacuum bag molding method, a Resin Transfer Molding (RTM) method, etc., to mold the fiber-reinforced resin member, the foregoing push-in plug or screw-in plug as a seal member may not be able to completely prevent entrance of the resin solution, but the resin solution that enters through a gap may harden to become a hardened resin burying the screw thread, depending on a condition, for example, regarding a place where the screw hole is formed within a molding die.

SUMMARY OF THE INVENTION

The invention provides a screw hole seal structure having a high sealing characteristic which is able to certainly prevent the entrance of a resin solution into a screw hole in molding a fiber-reinforced resin member, and also provides a method of producing a fiber-reinforced resin member through the use of the screw hole seal structure.

A first aspect of the invention relates to a screw hole seal structure that seals a screw hole in molding a fiber-reinforced resin member in which an insert member provided with the screw hole is integrally incorporated. In this screw hole seal structure, a screw member is tightened in the screw hole, and an elastic seal member is compressed within the screw hole, in an axial direction of the screw member, and is therefore deformed radially outwards by compression force that is created by tightening of the screw member, and an air-tight state of the screw hole is maintained by deformation of the elastic seal member.

According to the invention, the amount of radially outward deformation of the elastic seal member can be increased in accordance with the amount of tightening of the screw member. Therefore, the pressing force that presses the elastic seal member against an inner peripheral surface or the like of the screw hole can be increased, and the air-tight state of the screw hole can be certainly maintained.

Therefore, even in the case where a molding method that uses vacuuming the interior of a molding die, such as a vacuum bag molding method, an RTM molding method, etc., is used as a molding method of molding the fiber-reinforce resin member, it is possible to completely seal the screw hole and certainly prevent the resin solution from entering the screw hole.

Besides, since the elastic seal member can be made beforehand as a separate part, an elastic seal member that has been completely hardened can be used, for example, in the case where silicone is used as a material of the elastic seal member. Therefore, the seeping of oil from the elastic seal member can be prevented in molding the fiber-reinforced resin member, and the influence of oil on the fiber-reinforced resin can be excluded.

A second aspect of the invention relates to a screw hole seal structure that seals a screw hole in molding a fiber-reinforced resin member in which an insert member provided with the screw hole is integrally incorporated. This screw hole seal structure includes a screw member tightened in the screw hole, and an elastic seal member disposed within the screw hole. In this screw hole seal structure, the elastic seal member is compressed in an axial direction of the screw member and is deformed radially outwards by compression force created by tightening of the screw member so that an air-tight state of the screw hole is maintained.

Each of the screw hole seal structures of the first and second aspects may include a first seal tape stuck to the insert member, and the first seal tape may be stuck to the insert member so as to close an opening portion of the screw hole at a side of insertion through which the screw member is inserted into the screw hole. According to this construction, the entrance of the resin solution into the screw hole can be further prevented, and the screw hole can be more completely sealed.

Besides, in the screw hole seal structures of the first and second aspects, the screw member may have a length substantially equal to a length of the screw hole, and when the screw member is tightened in the screw hole, a head top surface of a head of the screw member may be flush with a side surface of the insert member that is at the screw member insertion side.

Besides, in the screw hole seal structures of the first and second aspects, the screw hole may be formed through the insert member, and an opening portion of the screw hole at a side opposite to the screw member insertion side may face a molding die of the fiber-reinforced resin member. According to this construction, the screw member can be contacted with the molding die by tightening the screw member into the screw hole. According to this construction, by further tightening the screw member into the screw hole, the distal end of the screw member protrudes from the opening portion of the screw hole that is at the side opposite to the screw member insertion side, and the fiber-reinforced resin member can be moved in such a direction as to move apart from the molding die. Therefore, the screw member can be used as a jig for releasing the die, and the operation of releasing the fiber-reinforced resin member from the molding die can be facilitated.

Besides, each of the screw hole seal structures of the first and second aspects may include a second seal tape stuck to the insert member, and the second seal tape may be stuck to the insert member so as to close the opening portion of the screw hole that is at the side opposite to the screw member insertion side. According to this construction, the entrance of the resin solution into the screw hole through the opening portion of the screw hole that is at the side opposite to the screw member insertion side can be prevented, and the screw hole can be more completely sealed.

Besides, in the screw hole seal structures of the first and second aspects, a distal end surface of the external thread portion of the screw member may be flush with a side surface of the insert member at the side opposite to the screw member insertion side.

Besides, in the screw hole seal structures of the first and second aspect, the elastic seal member may be a separate member from the screw member. According to this construction, after the elastic seal member is moved from the screw member, the screw member can be used also as a mold release jig for releasing the fiber-reinforced resin member from the molding die by tightening the screw member into the screw hole. Therefore, there is no need to newly prepare a screw member for the purpose of mold release, and therefore the number of component parts can be cut down.

In the screw hole seal structures of the first and second aspects, the elastic seal member may be provided integrally with the screw member. Due to this construction, the number of component parts can be lessened, and the labor of the operation of assembling the elastic seal member and the screw member at an actual site of production can be reduced.

A third aspect of the invention relates to a screw hole seal structure that seals a screw hole in molding a fiber-reinforced resin member in which an insert member provided with the screw hole is integrally incorporated. This screw hole seal structure includes a screw member tightened in the screw hole, and an elastic seal member disposed within the screw hole. In this structure, the screw hole has a counterbore that is formed at a screw member insertion side of the screw hole through which the screw member is inserted into the screw hole, an internal thread portion which is formed to a side of the counterbore that is opposite to the screw member insertion side and which is smaller in diameter than the counterbore, and a counterbore seat that is formed between the counterbore and the internal thread portion. The screw member has an external thread portion that extends in an axial direction of the screw member and that is tightened into the internal thread portion, a head portion of that is larger in diameter than the external thread portion and that is disposed within the counterbore by tightening the external thread portion into the internal thread portion, and a shaft step portion formed between the external thread portion and the head portion. The elastic seal member is compressed between the counterbore seat and the shaft step portion, and is pressed against an inner peripheral surface of the counterbore.

A fourth aspect of the invention relates to a method of producing a fiber-reinforced resin member in which an insert member provided with a screw hole is integrally incorporated. The method includes: incorporating the insert member into a core part; layering a first molding intermediate material and a second molding intermediate material on first surface of the core part and a second surface of the core part that is opposite the first surface, respectively; forming an air-tight seal in the screw hole by disposing an elastic seal member between the screw member and the screw hole, and tightening the screw member into the screw hole so as to compress the elastic seal member and thereby deform the screw member radially outwards; molding the fiber-reinforced resin member that includes the insert member, the core part, and each molding intermediate material that is hardened, by hardening each molding intermediate material after incorporating the insert member, layering the first molding intermediate material and the second molding intermediate material and forming the air-tight seal in the screw hole; and releasing the screw member and the elastic seal member from the molded fiber-reinforced resin member after molding the fiber-reinforced resin member.

In the method of the fourth aspect, in molding the fiber-reinforced resin member, the insert member, the core part, each molding intermediate material, the elastic seal member, and the screw member may be covered with a bag, and each molding intermediate material may be hardened by vacuuming and heating an interior of the bag.

The method of the fourth aspect may further include closing an opening portion of the screw hole by sticking a seal tape to an end portion of the insert member after incorporating the insert member and forming the air-tight seal in the screw hole, and when the interior of the bag is vacuumed in molding the fiber-reinforced resin member after closing the opening portion of the screw hole, the seal tape may be additionally covered with the bag, and in releasing the screw member and the elastic seal member, the seal tape may be additionally separated from the molded fiber-reinforced resin member.

In the method of the fourth aspect, in layering the first molding intermediate material and the second molding intermediate material, the first molding intermediate material may be layered on a molding surface of the molding die, and the core part and the insert member may be layered on the first molding intermediate material, and the second molding intermediate material may be layered on the core part and the insert member, and in molding the fiber-reinforced resin member, when the interior of the bag is vacuumed, the molding die may be additionally covered with the bag, and in releasing the screw member and the elastic seal member, the molding die may be additionally released from the fiber-reinforced resin member that is molded.

The method of the fourth aspect may further include releasing the molding die from the molded fiber-reinforced resin member by tightening only the screw member separated, into the screw hole of the insert member again, and separating the screw member from the molded fiber-reinforced resin member after releasing the molding die.

According to the first, second, third and fourth aspects, the amount of radially outward deformation of the elastic seal member can be increased in accordance with the amount of tightening of the screw member. Therefore, the air-tight state of the screw hole can be certainly maintained by increasing the pressing force that presses the elastic seal member against an inner peripheral surface or the like of the screw hole, so that the entrance of the resin solution into the screw hole can be prevented.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
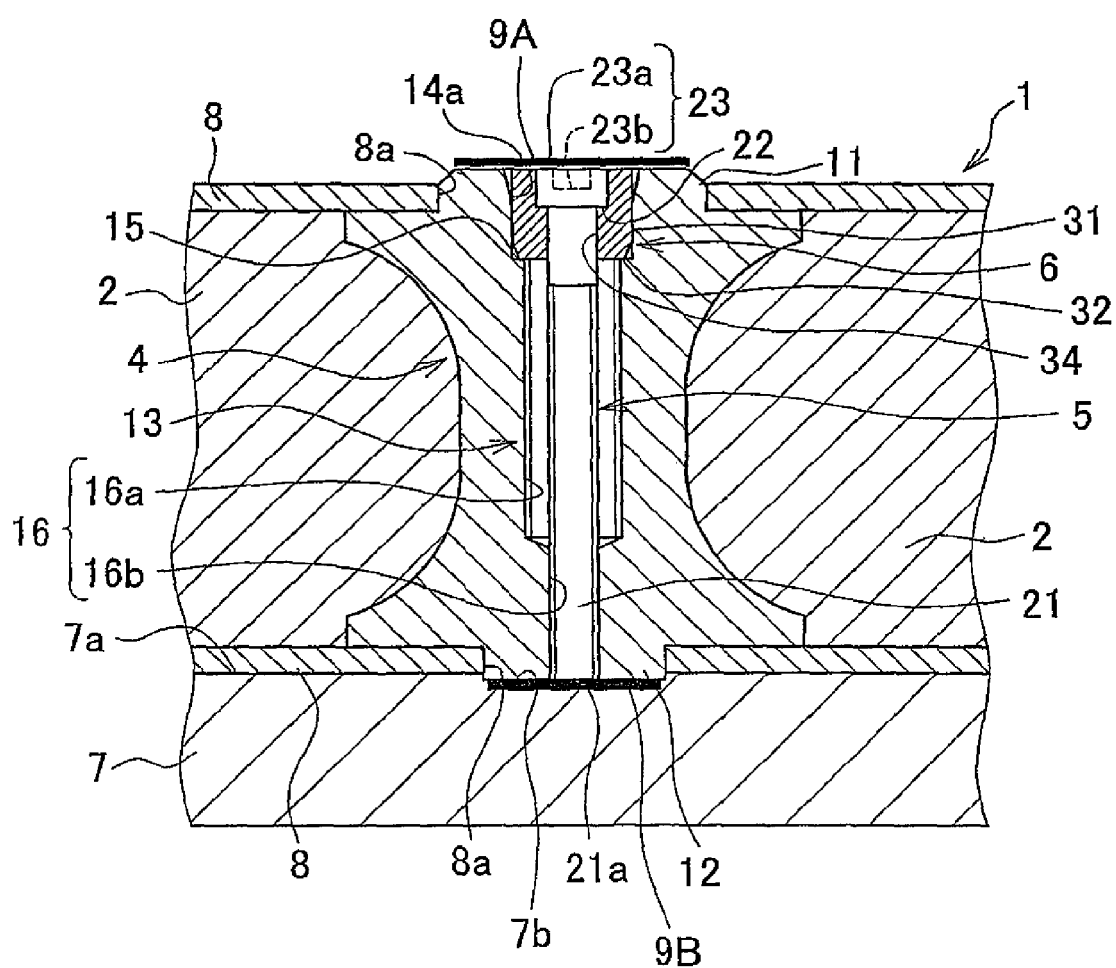
FIG. 1 is a sectional view illustrating a screw hole seal structure in accordance with a first embodiment of the invention.

Embodiments of the screw hole seal structure of the invention will be described with reference to the drawings.

First Embodiment

It is to be noted herein that although an upper side and a lower side shown in the drawings are termed the upper side and the lower side for the sake of convenience in description, they are not limited to the upper and lower side relative to the ground.

Figure 4:
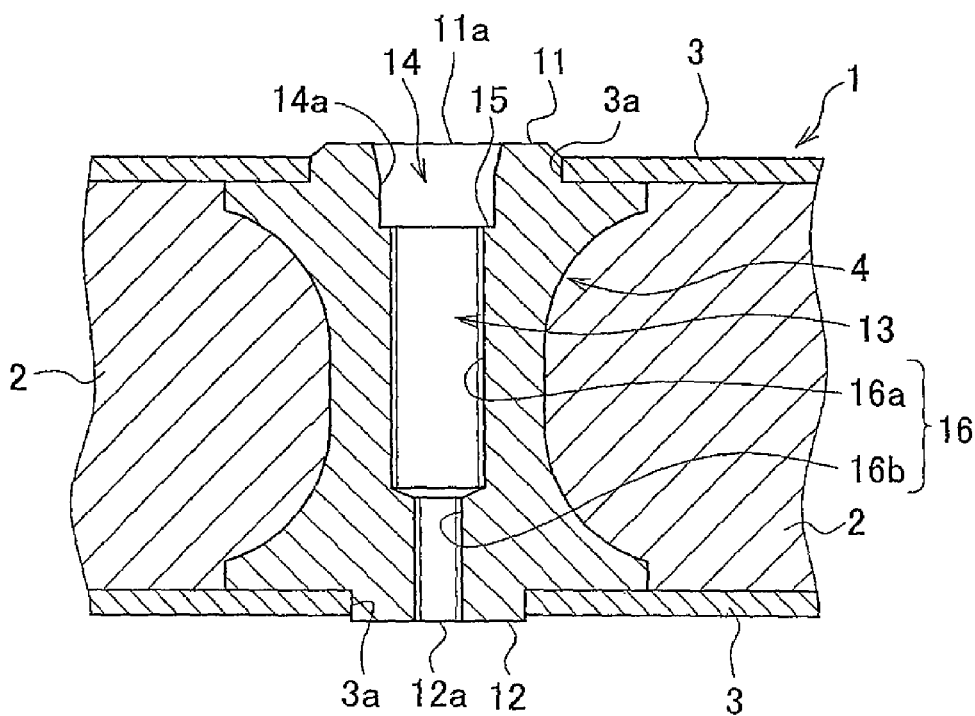
FIG. 4 is a diagram showing a molded state of a fiber-reinforced resin member in accordance with the first embodiment.

A fiber-reinforced resin member 1, whose molded state is shown in FIG. 4, has a layered structure in which a fiber-reinforced resin 3 is layered on an upper surface and a lower surface of a core part 2. The fiber-reinforce resin member 1 is molded, with an insert member 4 incorporated integrally within the resin member 1.

The core part 2 used herein is a foamed core. The material of the foamed core is not particularly limited, and may be, for example, a foam of polyurethane, polystyrene, or polypropylene. Preferably, a urethane foamed core formed from polyurethane foam is used. In addition, the core part 2 is not limited to a foamed core, but may also be, for example, a honeycomb core.

In a first embodiment, the fiber-reinforced resin 3 is formed by heat-hardening a prepreg 8 (see FIG. 1 or FIG. 2), which is a molding intermediate material obtained by impregnating a fibrous base material with a resin solution of the matrix resin. The fibrous base material may be reinforcement fiber, such as glass fiber, carbon fiber, etc., and the matrix resin used herein may be a thermosetting resin or a thermoplastic resin. The fiber-reinforced resin 3 is not limited to the prepreg 8, but may also be formed by pouring a resin solution into the molding die 7 so that the resin solution be impregnated into the fibrous base material, and then may be hardened by heat.

The insert member 4 is made of a generally cylindrical metal block, and is interposed between the two fiber-reinforced resin layers 3. The insert member 4 is integrally incorporated into and extends through the core part 2. An upper end portion 11 and a lower end portion 12 of the insert member 4 are exposed through an opening portion 3a of each fiber-reinforced resin layer 3. In addition, the insert member 4 includes a screw hole 13 that is formed in the insert member 4 before the insert member 4 is embedded in the core part 2. The upper end portion 11 of the insert member 4 has a first opening portion 11a of the screw hole 13 through which a corresponding screw is inserted into the screw hole 13. The lower end portion 12 has a second opening portion 12a of the screw hole 13 that opens at the opposite end of the screw hole 13 from the first opening portion 11a.

The screw hole 13 has a counterbore 14 that is formed at the side of screw insertion, that is, the upper side of the screw hole 13, and further has an internal thread portion 16 that is formed at the side opposite to the side of screw insertion, that is, at the lower side of the counterbore 14, and that has a smaller diameter than the counterbore 14, and a counterbore seat 15 that is formed between the counterbore 14 and the internal thread portion 16. The internal thread portion 16 includes a first internal thread portion 16a, and a second internal thread portion 16b that has a smaller in thread diameter than the first internal thread portion 16a. The first internal thread portion 16a is formed at the upper side, and the second internal thread portion 16b is formed at the lower side. The counterbore seat 15 has a surface that extends in a planar fashion along directions orthogonal to the axial direction of the screw hole 13, and that faces upward.

Before the above-described fiber-reinforced resin member 1 is molded, the screw hole 13 is sealed by inserting the elastic seal member 6 and tightening the screw member 5, as shown in FIG. 1. The fiber-reinforced resin member 1 may then be molded via vacuum bag molding while the screw hole 13 is kept air-tight.

In the vacuum bag molding method, the fiber-reinforced resin member 1 and a molding die 7 are covered with a sheet-shape vacuum bag (not shown), and the interior of the vacuum bag is vacuumed to perform the molding. Incidentally, the molding method in this invention is not limited to the vacuum bag molding method, but it is also permissible to utilize a resin infusion (RI) method, a resin transfer molding (RTM) method, or a structure-reaction injection molding (S-RIM) method.

The screw member 5 is shaped so that it may be tightened into the screw hole 13 of the insert member 4 and thereby close the screw hole 13. Concretely, the screw member 5 is substantially the same length as the screw hole 13, and, in a state where the screw member 5 is tightened into the screw hole 13, a top surface 23a of a head 23 of the screw member 5 sits flush with the upper end surface of the upper end portion 11 of the insert member 4, and the distal end surface 21a of an external thread portion 21 of the screw member 5 sits flush with the lower end surface of the lower end portion 12 of the insert member 4.

Figure 2:
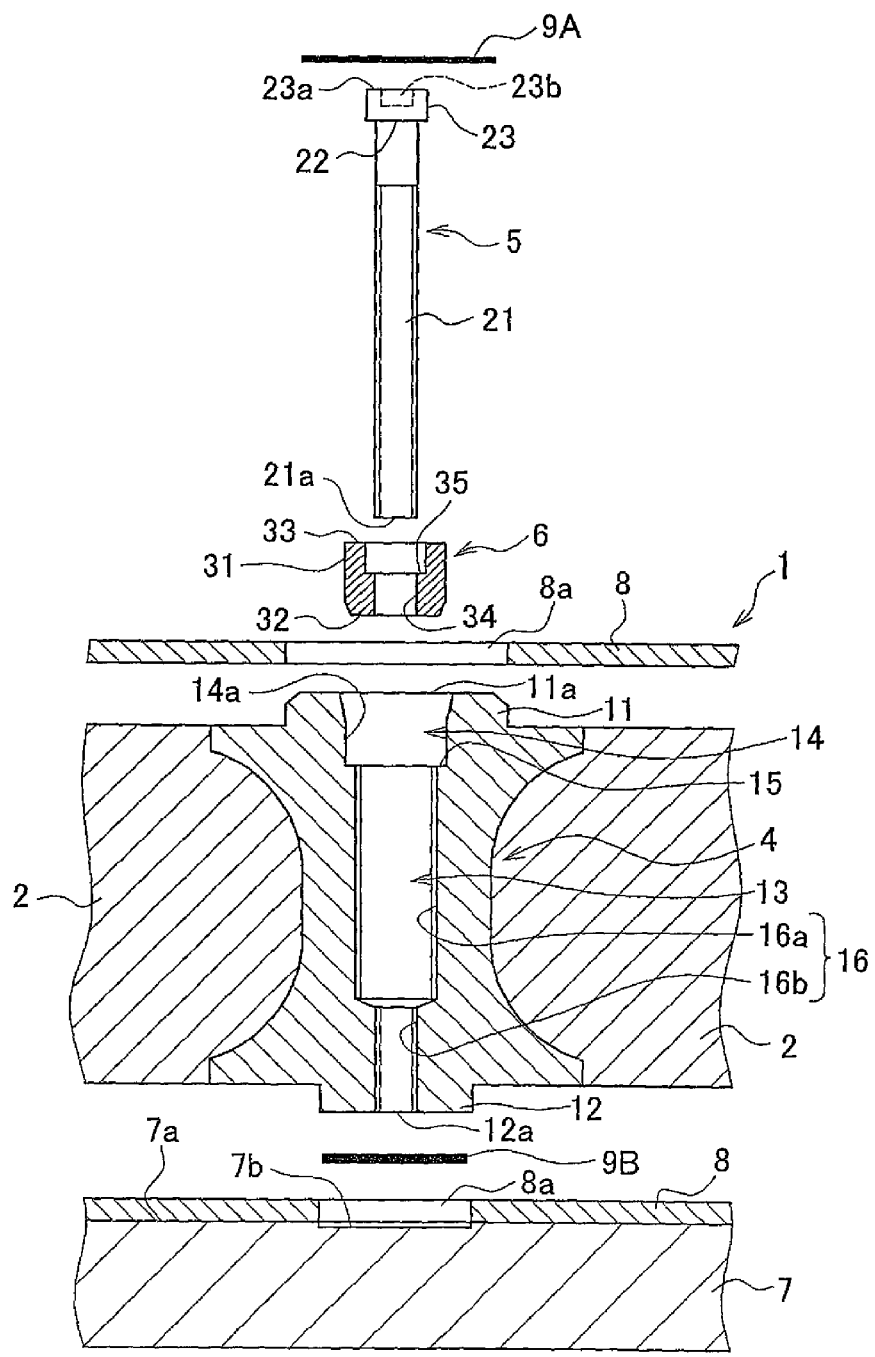
FIG. 2 is an exploded view illustrating the screw hole seal structure of the first embodiment.

The screw member 5, as shown in FIG. 1 or FIG. 2, includes an external thread portion 21 that extends in the axial direction within the screw hole 13 and that is tightened into the second internal thread portion 16b. The screw member 5 also includes the head 23 that is formed above the external thread portion 21 and that has larger diameter than the external thread portion 21, and that is disposed within a counterbore 14 by tightening the external thread portion 21 into the second internal thread portion 16b. The screw member 5 further includes a shaft step portion 22 formed between the external thread portion 21 and the head 23. The head 23 is sized to allow the entire head 23 to fit within the counterbore 14, and has the hexagonal hole 23b for detachment of the screw member 5. The shaft step portion 22 has a surface that extends in a planar fashion in directions orthogonal to the axial direction of the screw member 5, and that faces the distal end side of the screw member 5.

The elastic seal member 6 is an elastic member having heat resistance, thermal expansibility, and high elastic modulus, and may be constructed of a silicone that has been completely hardened. The elastic seal member 6 is disposed between the shaft step portion 22 of the screw member 5 and a counterbore seat 15 of the screw hole 13 as shown in FIG. 1.

Due to the compression force created by tightening the screw member 5, the elastic seal member 6 is compressed in the axial direction of the screw member 5 within the screw hole 13, and therefore elastically deforms radially outwards. Therefore, an outer peripheral surface 31 of the elastic seal member 6 is pressed on an inner peripheral surface 14a of the counterbore 14. Thus, an air-tight state of the screw hole 13 is formed.

The elastic seal member 6 is provided separately from the screw member 5, as shown in FIG. 2. The elastic seal member 6 has a cylindrical shape that may be pressed into the counterbore 14. Within the counterbore 14, a lower end surface 32 of the elastic seal member 6 contacts the counterbore seat 15 of the screw hole 13, and an upper end surface 33 of the elastic seal member 6 sits flush with the upper end surface of the upper end portion 11 of the insert member 4.

At the axial center of the elastic seal member 6, a penetration hole 34 is formed so that the external thread portion 21 of the screw member 5 may be inserted through the penetration hole 34. An upper end portion of the penetration hole 34 has a larger diameter than the lower end portion thereof. A step portion 35 is formed between the upper end portion and the lower end portion of the penetration hole 34. The elastic seal member 6 can be moved so as to be pressed into the counterbore 14 by placing the head 23 of the screw member 5 into the penetration hole 34, bringing the shaft step portion 22 of the screw member 5 into contact with the step portion 35, and then tightening the screw member 5.

After the screw member 5 and the elastic seal member 6 are inserted to the screw hole 13 of the insert member 4, seal tapes 9A and 9B are stuck to the upper end portion 11 and the lower end portion 12, respectively, of the insert member 4 to close the first opening portion 11a and the second opening portion 12a, respectively, of the screw hole 13. The seal tapes 9A and 9B are sheet-like members that are formed of as synthetic resin material, for example, Teflon (registered trademark), or the like, and the sticking surface is provided with an adhesive.

The seal tape 9A prevents the resin solution from entering the space between the counterbore 14 and the elastic seal member 6, the space between the elastic seal member 6 and the screw member 5, and the hexagonal hole 23b. In addition, if oil seeps through the elastic seal member 6, the seal tape 9A also prevents the oil from adhering to the fiber-reinforced, resin 3 (prepreg 8). The seal tape 9B prevents the resin solution from entering the space between the internal thread portion 16b of the insert member 4 and the external thread portion 21 of the screw member 5.

When the fiber-reinforced resin member 1 is to be formed, the screw member 5 is fitted into the screw hole 13 of the insert member 4, with the elastic seal member 6 fitted around the screw member 5. In addition, the insert member 4 is integrally incorporated into the core part 2, as shown in FIG. 2.

By tightening the screw member 5 into the screw hole 13, the elastic seal member 6 is compressed between the shaft step portion 22 of the screw member 5 and the counterbore seat 15 of the screw hole 13 and is elastically deformed radially outwards, so that the outer peripheral surface 6a of the elastic seal member 6 is pressed against the inner peripheral surface 14a of the counterbore 14. Then, the seal tapes 9 are stuck to the upper end portion 11 and the lower end portion 12 of the insert member 4 to close the first opening portion 11a and the second opening portion 12a of the screw hole 13.

Next, a prepreg 8 that will form the fiber-reinforced resin 3 after being heat-hardened is layered on a molding surface 7a of the molding die 7. The prepreg 8 is layered so that the position of the opening portion 8a coincides with a positioning hole 7b formed in the molding surface 7a. After that, the core part 2 and the insert member 4 are layered on the prepreg 8. The core part 2 and the insert member 4 are positioned by inserting the lower end portion 12 of the core part 2 into the positioning hole 7b. As a result, the opening portion of the screw hole 13 is disposed facing the molding die 7.

Then, the prepreg 8 that forms the upper-side fiber-reinforced resin layer 3 after being heat-hardened is placed on the core part 2, thus assuming the state shown in FIG. 1. The prepreg 8 is positioned by inserting the upper end portion 11 of the insert member 4 into the opening portion 8a. Then, the insert member 4, the core part 2, the prepregs 8 on the upper and lower sides of the core part 2, the elastic seal member 6, the screw member 5, the seal tapes 9A and 9B and the molding die 7 are covered with a vacuum bag (not shown), the interior of the vacuum bag is vacuumed and is heated to mold the fiber-reinforced resin member 1 that includes the insert member 4, the core part 2, and the fiber-reinforced resin layers 3 on the upper and lower sides of the core part 2.

Figure 3:
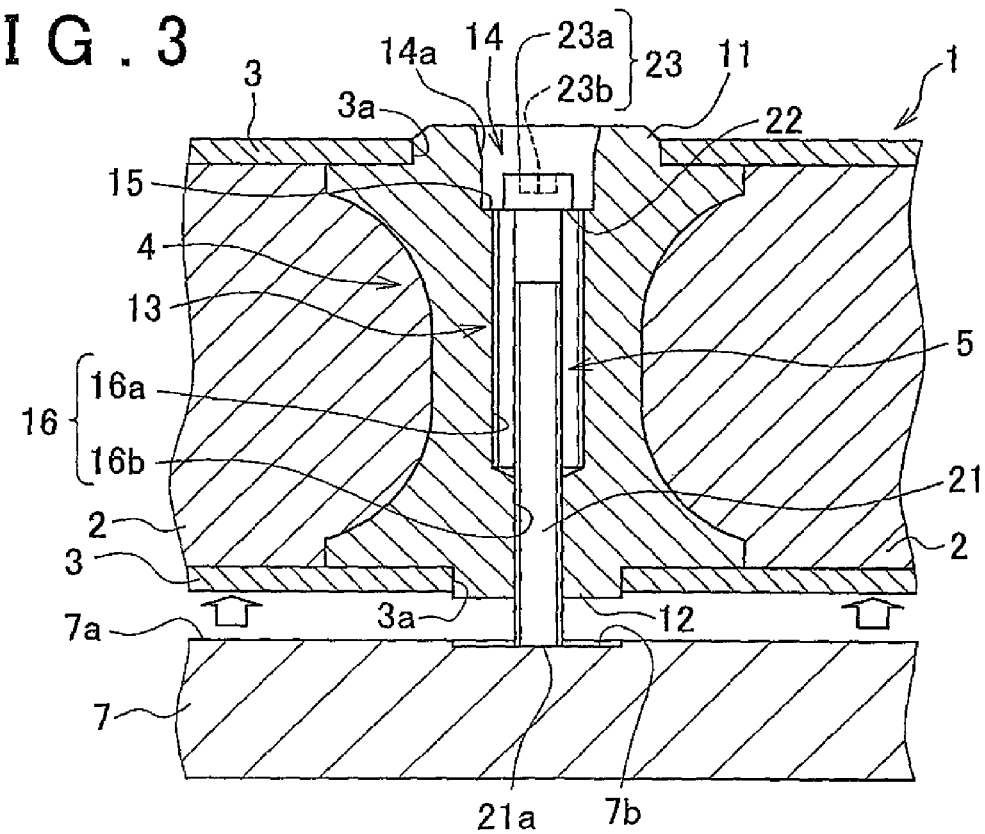
FIG. 3 is a diagram illustrating a mold release method in accordance with the first embodiment.

After molding, the seal tape 9A is removed from the insert member 4, and the screw member 5 and the elastic seal member 6 are extracted from the insert member 4. After the elastic seal member 6 is removed from the screw member 5, the screw member 5 is tightened back into the screw hole 13 of the insert member 4. In this manner, the distal end portion of the screw member 5 is brought into contact with the molding die 7. Then, the screw member 5 is further tightened into the screw hole 13 so as to be protruded from the lower end portion 12 of the insert member 4 as shown in FIG. 3. Therefore, the fiber-reinforced resin member 1 is released from the molding die 7 by moving the member 1 in such an upward direction as to separate from the molding die 7. Hence, the seal tape 9B is separated from the fiber-reinforced resin member 1. Therefore, the screw member 5 may be used also as a mold release jig, and therefore the operation of releasing the fiber-reinforced resin member 1 from the molding die 7 is facilitated.

The foregoing screw hole seal structure makes it possible to increase the amount of radially outward deformation of the elastic seal member 6 according to the tightening of the screw member 5. Therefore, the pressing force that presses the outer peripheral surface 31 of the elastic seal member 6 against the inner peripheral surface 14a of the counterbore 14 of the screw hole 13 may be increased. Therefore, the outer peripheral surface 31 of the elastic seal member 6 can be pressed against the inner peripheral surface 14a of the counterbore 14 with increased pressing force, so that the air-tight state of the screw hole 13 can be certainly maintained.

Therefore, even if a molding method that uses vacuuming, such as a vacuum bag molding method or the like, to mold the fiber-reinforced resin member 1, it is possible to certainly prevent entry of the resin solution through the space between the elastic seal member 6 and the screw hole 13.

Furthermore, in this embodiment, because the outer peripheral surface 31 of the elastic seal member 6 is pressed against the inner peripheral surface 14a of the counterbore 14, a large area in the axial direction of the counterbore 14 can be pressed. Therefore, even if the step surface of the shaft step portion 22, and the step surface of the counterbore seat 15 cannot be formed with a large area, it is possible to maintain the air-tight state of the screw hole 13.

Because the elastic seal member 6 is formed as a separate part in advance, the elastic seal member 6 may be made of completely hardened silicone. Therefore, seepage of oil from the silicone of the elastic seal member 6 may be prevented, and the influence of oil on the fiber-reinforced resin 3 can be excluded.

Furthermore, according to the foregoing construction, the seal tapes 9A and 9B are stuck to the upper end portion 11 and the lower end portion 12 of the insert member 4, and close the first opening portion 11a and the second opening portion 12a of the screw hole 13. Therefore, the seal tape 9A prevents the resin solution from entering the space between the counterbore 14 of the screw hole 13 and the elastic seal member 6, the space between the penetration hole 34 of the elastic seal member 6 and the head 23 of the screw member 5, and the interior of the hexagonal hole 23b formed in the head 23 of the screw member 5. Besides, the seal tape 9B prevents the resin solution from entering the space between the second internal thread portion 16b of the screw hole 13 and the external thread portion 21 of the screw member 5.

Therefore, in the process of molding the fiber-reinforced resin member 1, in which the insert member 4 having the screw hole 13 is integrally incorporated, it is possible to prevent the resin solution from seeping through the prepregs 8 and entering the screw hole 13, and therefore prevent the thread of the internal thread portion 16 from being buried by a hardened resin.

Accordingly, the fiber-reinforced resin member 1 in which the insert member 4 having the screw hole 13 is integrally incorporated can be molded. Therefore, the drying process after molding, as in the related art, may be omitted, and the fiber-reinforced resin member 1 is produced quickly and easily, so that the production cost can be reduced.

Second Embodiment

Figure 5:
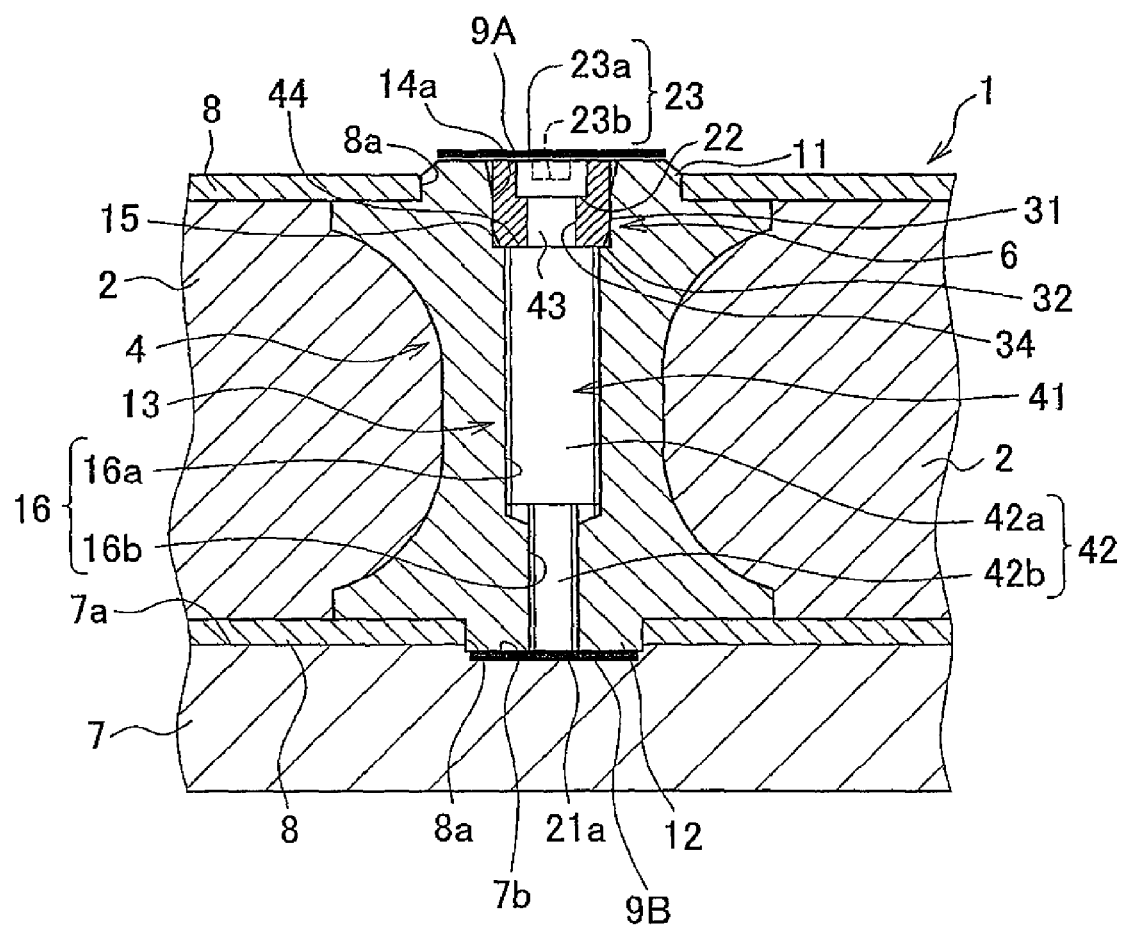
FIG. 5 is a sectional view illustrating a screw hole seal structure in accordance with a second embodiment of the invention.

Next, a second embodiment of the invention will be described with reference to FIG. 5. In addition, component elements substantially the same as those in the foregoing first embodiment are represented by the same reference characters, and detailed descriptions thereof are omitted below.

A feature of this embodiment is that an elastic seal member 6 is provided integrally with a screw member 41. The screw member 41, as shown in FIG. 5, has such a shape as to be tightened into a screw hole 13 of an insert member 4 and close the screw hole 13.

Concretely, the screw member 41 has substantially the same length as the screw hole 13. When the screw member 41 has been tightened into the screw hole 13, the top surface 23a of the head 23 of the screw member 41 sits flush with an upper end surface of the upper end portion 11 of the insert member 4, and a distal end surface 21a of an external thread portion 21 sits flush with a lower end surface of the lower end portion 12 of the insert member 4.

The screw member 41 has an external thread portion 42 and a shaft portion 43 as well as the head 23. The external thread portion 42 has a first external thread portion 42a that is tightened into a first internal thread portion 16a, and a second external thread portion 42b that is tightened into a second internal thread portion 16b. The shaft portion 43 has a smaller diameter than the external thread portion 42 and the head 23. A shaft step portion 44 is formed between the shaft portion 43 and the external thread portion 42, and another shaft step portion 22 is formed between the shaft portion 43 and the head 23.

The shaft step portion 44 is formed in a planar fashion in directions orthogonal to the axial direction of the screw member 5, and faces upward. The shaft step portion 22 is formed in a planar fashion in directions orthogonal to the axial direction of the screw member 5, and faces downward.

The elastic seal member 6 is provided integrally with the screw member 41, with the shaft portion 43 and the head 23 of the screw member 41 inserted through the penetration hole 34 of the elastic seal member 6. The lower end surface 32 of the elastic seal member 6 protrudes radially outward from the first external thread portion 42a, and is in contact with the counterbore seat 15 of the screw hole 13.

According to the foregoing construction of the second embodiment, because the screw member 41 and the elastic seal member 6 are integrally provided, the number of component parts may be reduced, and the labor required to assemble the screw member 41 and the elastic seal member 6 at an actual site of production may be reduced.

After the fiber-reinforced resin member 1 is molded, the screw member 41 and the elastic seal member 6 are removed from the screw hole 13. Then, for example, by tightening the screw member 5 in the first embodiment into the screw hole 13, the distal end of the screw member 5 is brought into contact with the molding die 7. Then, by further tightening the screw member 5 into the screw hole 13, the fiber-reinforced resin member 1 can be moved in such a direction as to separate from the molding die 7. Therefore, the fiber-reinforced resin member 1 can easily be released from the molding die 7.

While the first and the second embodiments of the invention have been described with reference to the drawings, the concrete construction of the screw hole seal structure is not limited to the described embodiments. Instead, changes in design and the like made without departing from the scope of the invention are included within the invention.

The invention claimed is:

1. A screw hole seal structure for sealing a screw hole during molding a fiber-reinforced resin member in which an insert member provided with the screw hole is integrally incorporated, comprising:
  a screw member tightened in the screw hole; and
  an elastic seal member disposed within the screw hole,
  wherein the screw hole has a counterbore that is formed at a screw member insertion side of the screw hole through which the screw member is inserted into the screw hole, an internal thread portion which is formed to a side of the counterbore that is opposite to the screw member insertion side and which is smaller in diameter than the counterbore, and a counterbore seat that is formed between the counterbore and the internal thread portion,
  and wherein the screw member has an external thread portion that extends in an axial direction of the screw member and that is tightened into the internal thread portion, a head of that is larger in diameter than the external thread portion and that is disposed within the counterbore by tightening the external thread portion into the internal thread portion, and a shaft step portion formed between the external thread portion and the head,
  and wherein the elastic seal member is compressed between the counterbore seat and the shaft step portion, and is pressed against an inner peripheral surface of the counterbore.

* * * * *